US011860784B1

(12) United States Patent
Brennan et al.

(10) Patent No.: US 11,860,784 B1
(45) Date of Patent: Jan. 2, 2024

(54) LIVE PROFILE-DRIVEN CACHE AGING POLICIES

(71) Applicant: Advanced Micro Devices, Inc., Santa Clara, CA (US)

(72) Inventors: Christopher J. Brennan, Boxborough, MA (US); Akshay Lahiry, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/850,905

(22) Filed: Jun. 27, 2022

(51) Int. Cl.
*G06F 12/00* (2006.01)
*G06F 12/0802* (2016.01)

(52) U.S. Cl.
CPC ...... *G06F 12/0802* (2013.01); *G06F 2212/60* (2013.01)

(58) Field of Classification Search
CPC .................. G06F 12/0802; G06F 2212/60
See application file for complete search history.

(56) References Cited

U.S. PATENT DOCUMENTS

| | | | | |
|---|---|---|---|---|
| 5,452,440 A * | 9/1995 | Salsburg | ............... | G06F 12/123 714/E11.197 |
| 6,477,314 B1 * | 11/2002 | Tai | ....................... | H04N 5/9205 348/E5.053 |
| 10,049,427 B1 * | 8/2018 | Lachowsky | ............ | H04N 19/91 |
| 2003/0112366 A1 * | 6/2003 | Baylon | ................ | H04N 19/503 375/E7.184 |
| 2004/0139356 A1 * | 7/2004 | Ma | ........................ | G06F 1/3215 713/300 |
| 2009/0094431 A1 * | 4/2009 | Sarkar | ................. | G06F 12/1458 711/163 |
| 2009/0138670 A1 * | 5/2009 | Mutlu | ................. | G06F 13/1663 711/E12.001 |
| 2013/0332681 A1 | 12/2013 | Miller et al. | | |
| 2014/0149653 A1 * | 5/2014 | Udipi | ...................... | G06F 12/08 711/202 |
| 2015/0095472 A1 * | 4/2015 | Cardona | ................. | G06F 9/505 709/221 |
| 2015/0146648 A1 | 5/2015 | Viger et al. | | |
| 2016/0283393 A1 * | 9/2016 | Kawaba | .............. | G06F 12/0893 |
| 2017/0024568 A1 * | 1/2017 | Pappachan | .............. | G06F 21/64 |
| 2017/0271031 A1 * | 9/2017 | Sharon | .................... | G11C 29/52 |
| 2018/0359410 A1 * | 12/2018 | Ain-Kedem | .............. | G06T 1/20 |
| 2019/0146716 A1 | 5/2019 | Yang et al. | | |
| 2019/0172496 A1 * | 6/2019 | Lodato | ................. | G11B 27/036 |
| 2019/0206023 A1 | 7/2019 | Dimitrov et al. | | |
| 2019/0361808 A1 * | 11/2019 | Subramanian | ...... | G06F 12/0802 |
| 2021/0073126 A1 * | 3/2021 | Moyer | ................ | G06F 12/0802 |
| 2022/0374154 A1 * | 11/2022 | Campbell | ............. | G06F 3/0673 |
| 2022/0374367 A1 * | 11/2022 | Fang | ....................... | G06N 20/00 |

(Continued)

FOREIGN PATENT DOCUMENTS

EP          1031919 B1     8/2000

*Primary Examiner* — Shawn X Gu
*Assistant Examiner* — Mohammad S Hasan
(74) *Attorney, Agent, or Firm* — Volpe Koenig

(57) ABSTRACT

A technique for operating a cache is disclosed. The technique includes recording access data for a first set of memory accesses of a first frame; identifying parameters for a second set of memory accesses of a second frame subsequent to the first frame, based on the access data; and applying the parameters to the second set of memory accesses.

20 Claims, 6 Drawing Sheets

(56) References Cited

U.S. PATENT DOCUMENTS

2023/0096814 A1\* 3/2023 Moyer .................. G06F 12/123
　　　　　　　　　　　　　　　　　　　711/133
2023/0102891 A1\* 3/2023 Moyer .................. G06F 12/123
　　　　　　　　　　　　　　　　　　　711/118

\* cited by examiner

LIVE PROFILE-DRIVEN CACHE AGING POLICIES

BACKGROUND

Caches improve performance by storing copies of data considered likely to be accessed again in the future into a low latency cache memory. Improvements to cache technologies are constantly being made.

BRIEF DESCRIPTION OF THE DRAWINGS

A more detailed understanding can be had from the following description, given by way of example in conjunction with the accompanying drawings wherein.

DETAILED DESCRIPTION

A technique for operating a cache is disclosed. The technique includes recording access data for a first set of memory accesses of a first frame; identifying parameters for a second set of memory accesses of a second frame subsequent to the first frame, based on the access data; and applying the parameters to the second set of memory accesses.

Figure 1:
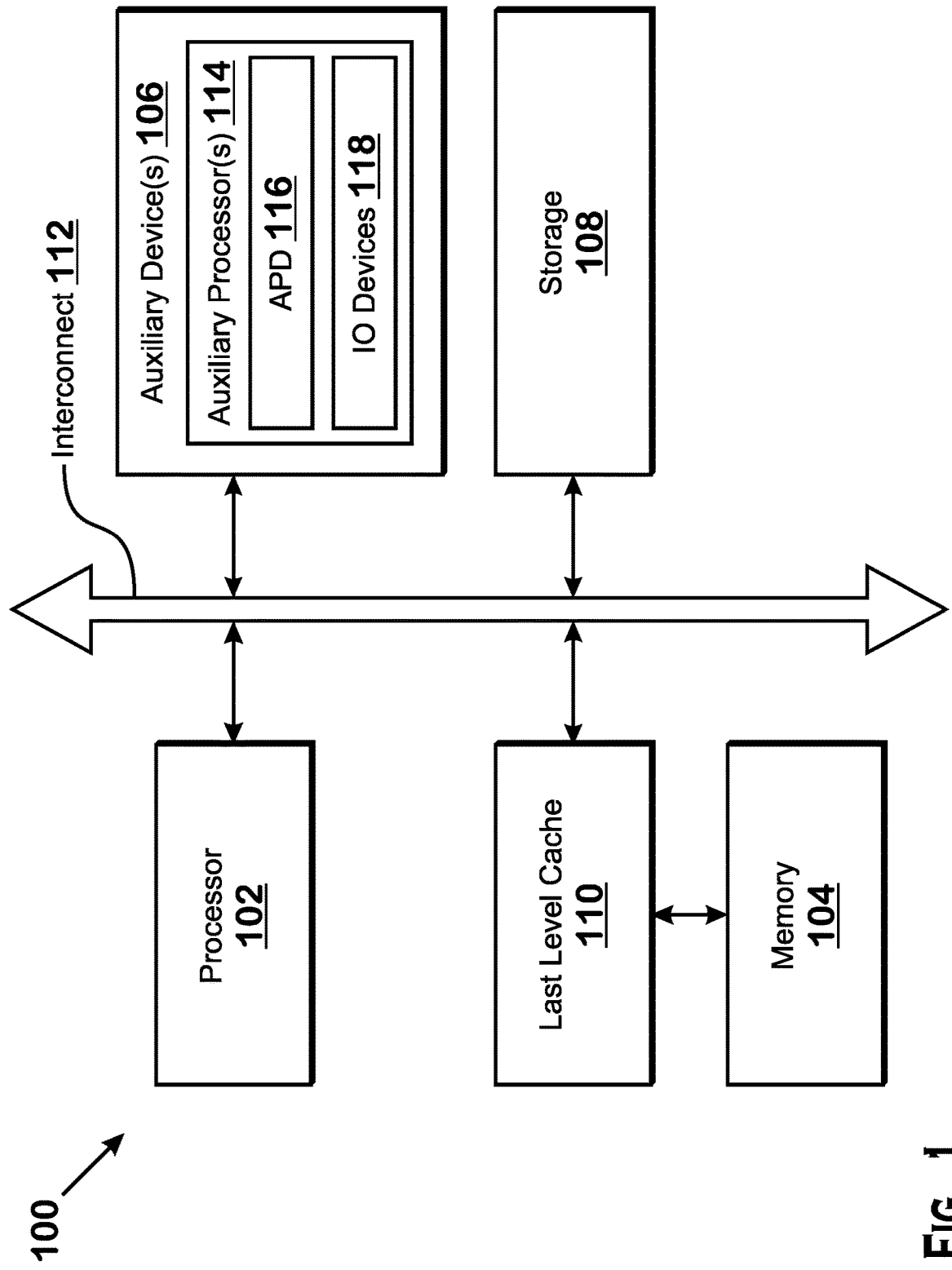
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, a storage 108, and a last level cache ("LLC") 110. An interconnect 112, which can be a bus, a combination of buses, and/or any other communication component, communicatively links the one or more processors 102, the memory 104, the one or more auxiliary devices 106, the storage 108, and the last level cache 110.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor. The auxiliary processor(s) 114 include an accelerated processing device ("APD") 116.

The one or more IO devices 118 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display, a speaker, a printer, a haptic feedback device, one or more lights, an antenna, or a network connection (e.g., a wireless local area network card for transmission and/or reception of wireless IEEE 802 signals).

The last level cache 110 acts as a shared cache for the various components of the device 100, such as the processor 102, the APD 116, and the various auxiliary devices 106. In some implementations, there other caches within the device 100. For example, in some examples, the processor 102 includes a cache hierarchy including different levels such as levels 1 and 2. In some examples, each such cache level is specific to a particular logical division of the processor 102, such as a processor core, or a processor chip, die, or package. In some examples, the hierarchy includes other types of caches as well. In various examples, one or more of the auxiliary devices 106 includes one or more caches.

In some examples, the last level cache 110 is "last level" in the sense that such a cache is the last cache that the device 100 attempts to service a memory access request from before servicing that request from the memory 104 itself. For example, if a processor 102 accesses data that is not stored in any of the cache levels of the processor 102, then the processor exports the memory access request to be satisfied by the last level cache 110. The last level cache 110 determines whether the requested data is stored in the last level cache 110. If the data is within the last level cache 110, the last level cache 110 services the request by providing the requested data from the last level cache 110. If the data is not within the last level cache 110, the device 100 services the request from the memory 104. As can be seen, in some implementations, the last level cache 110 acts as a final cache level before the memory 104, which helps to reduce the overall amount of memory access latency for accesses to the memory 104. Although techniques are described herein for operations involving the last level cache 110, it should be understood that the techniques can alternatively be used in other types of caches or memories.

Figure 2:
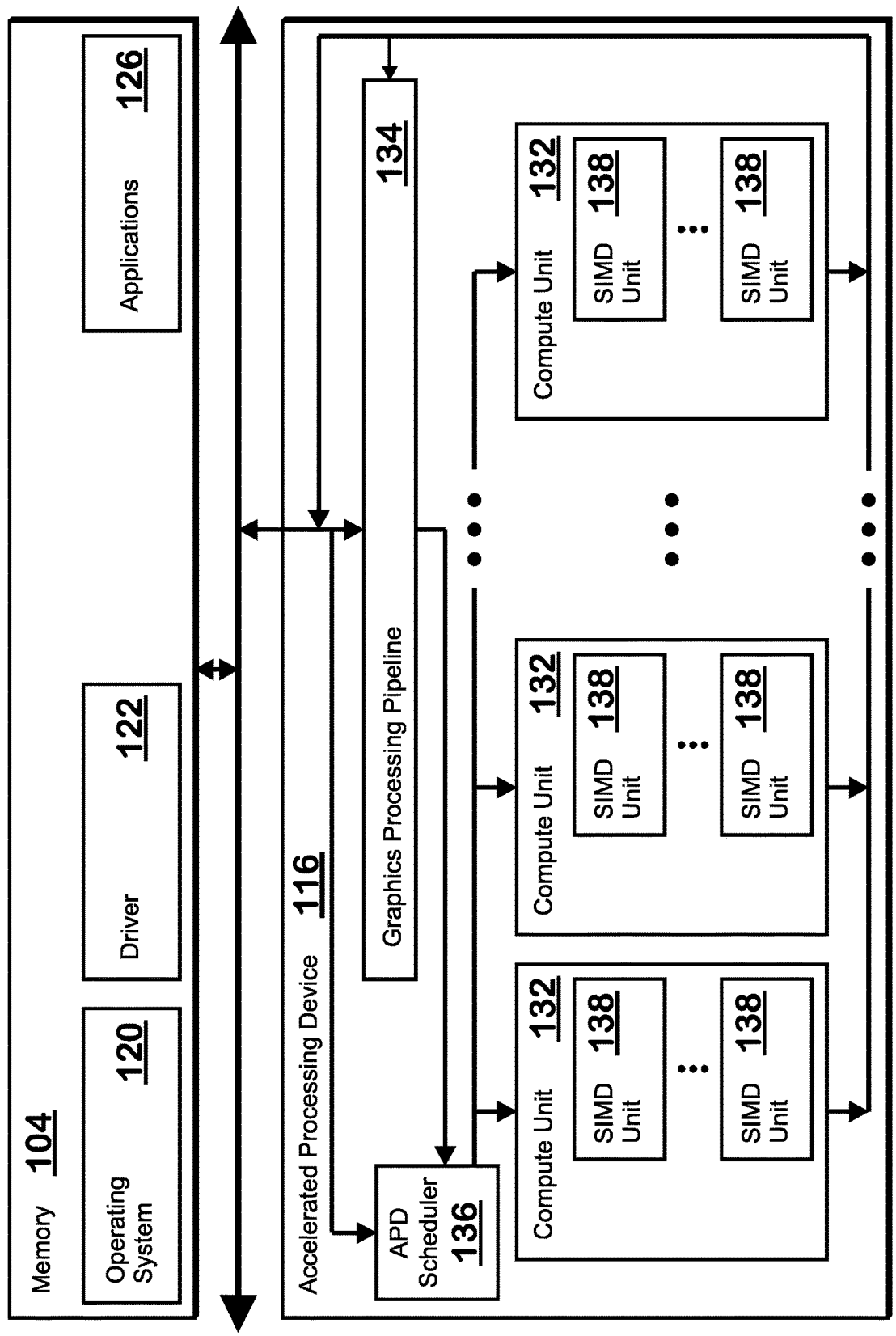
FIG. 2 is a block diagram of the device, illustrating additional details related to execution of processing tasks on the APD, according to an example.

FIG. 2 is a block diagram of the device 100, illustrating additional details related to execution of processing tasks on the APD 116, according to an example. The processor 102 maintains, in system memory 104, one or more control logic modules for execution by the processor 102. The control logic modules include an operating system 120, a driver 122, and applications 126, and may optionally include other modules not shown. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles shader code into shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102 or that are not part of the "normal" information flow of a graphics processing pipeline, or that are completely unrelated to graphics operations (sometimes referred to as "GPGPU" or "general purpose graphics processing unit").

The APD 116 includes compute units 132 (which may collectively be referred to herein as "programmable processing units") that include one or more SIMD units 138 that are configured to perform operations in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed.

The basic unit of execution in compute units 132 is a work-item. Each work-item represents a single instantiation of a shader program that is to be executed in parallel in a particular lane of a wavefront. Work-items can be executed simultaneously as a "wavefront" on a single SIMD unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as instances of parallel execution of a shader program, where each wavefront includes multiple work-items that execute simultaneously on a single SIMD unit 138 in line with the SIMD paradigm (e.g., one instruction control unit executing the same stream of instructions with multiple data). A command processor 137 is present in the compute units 132 and launches wavefronts based on work (e.g., execution tasks) that is waiting to be completed. A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, tessellation, geometry shading operations, and other graphics operations. A graphics processing pipeline 134 which accepts graphics processing commands from the processor 102 thus provides computation tasks to the compute units 132 for execution in parallel.

The compute units 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs," which may be compiled by the driver 122) that define such computation tasks to the APD 116 for execution. Although the APD 116 is illustrated with a graphics processing pipeline 134, the teachings of the present disclosure are also applicable for an APD 116 without a graphics processing pipeline 134. Various entities of the APD 116, such as the compute units 132, can make accesses to the last level cache 110.

Figure 3:
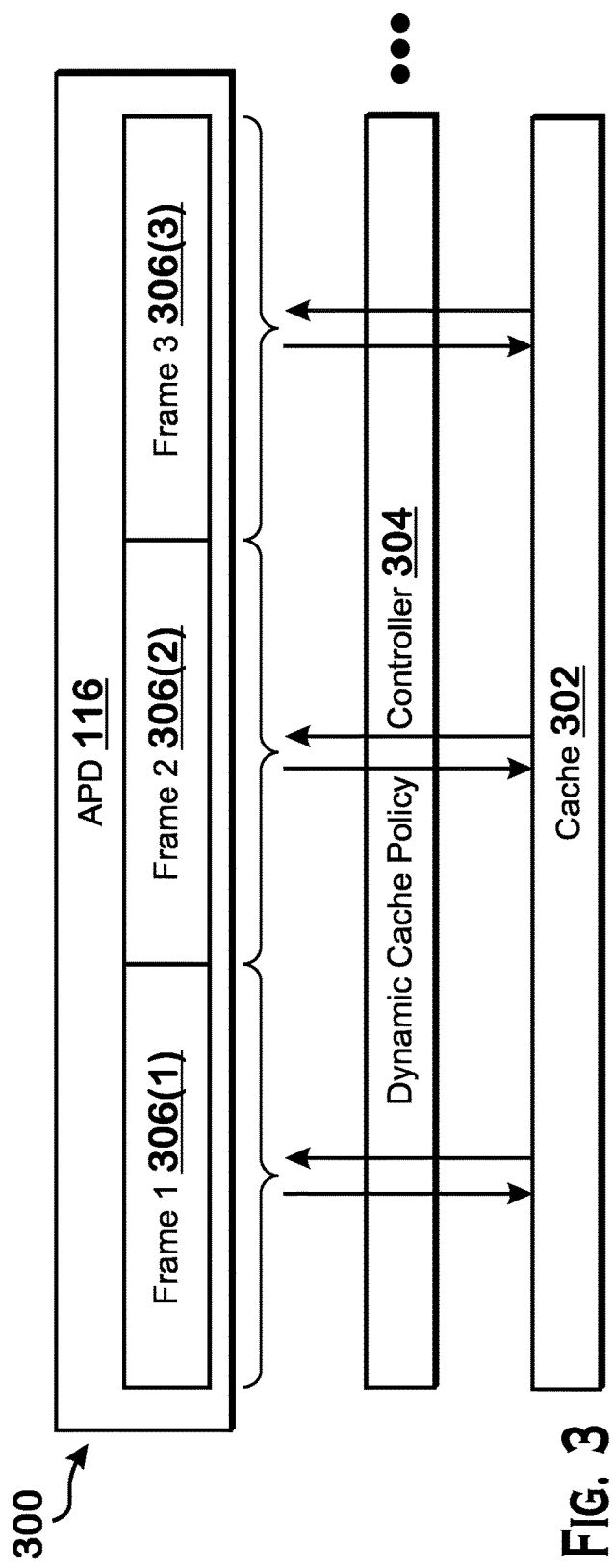
FIG. 3 illustrates a dynamic cache policy system for a cache, according to an example.

FIG. 3 illustrates a dynamic cache policy system 300 for a cache 302, according to an example. The system 300 includes the APD 116, the cache 302, and a dynamic cache policy controller 304. In some examples, the cache 302 is the last level cache 110 of FIG. 1. In other examples, the cache 302 is any other cache that services memory access requests by the APD 116. In some examples, the dynamic cache policy controller 304 is a hardware circuit, software executing on a processor, or a combination thereof. In some examples, the dynamic cache policy controller 304 is included in the cache 302 or is separate from the cache.

The APD 116 processes data for a series of frames 306. Each frame 306 is a full image rendered by the APD 116. To generate graphical data over time, the APD 116 renders a series of frame, each of which includes graphical objects for a particular instant in time.

To generate each frame 306, various components of the APD 116 access data stored in memory. These accesses are serviced by the cache 302, which stores copies of accessed data. Accessed data includes a wide variety of data types for rendering graphics, such as geometry data (e.g., vertex coordinates and attributes), texture data, pixel data, or a wide variety of other types of data. Aspects of cache performance such as hit rate (ratio of hits in the cache to total number of accesses) depend in part on how the cache 302 retains data in the event of an eviction. Cache replacement policies indicate which cache lines to evict when a new cache line is to be brought into a cache. A wide variety of replacement policies and other techniques are known. However, many of these techniques suffer from inaccuracies due to overly general rules that may not apply to particular items of data. For example, a least recently used replacement policy is not appropriate for all data access patterns.

For at least these reasons, the dynamic cache policy controller 304 dynamically applies cache management policies to access requests from the APD 116 based on observed history of accesses. The dynamic cache policy controller 304 maintains cache usage data that records memory access information over the course of a frame. The memory access information is related to aspects of memory accesses such as re-reference interval and re-reference intensity for memory pages. A re-reference interval is the "time" (for example, number of clock cycles, number of instructions, or other measure of "time") between accesses to a particular memory page. A re-reference intensity is the frequency of accesses to a particular memory page in a given amount of "time" (for example, number of clock cycles, number of instructions, or other measure of time).

Based on the memory access information from previous frames, the dynamic cache policy controller 304 applies memory access policies to memory access requests from the APD 116 in a current frame. More specifically, patterns of memory accesses are generally very similar from frame to frame. Therefore, it is possible to make observations about memory accesses in one frame and to use those observations to control the memory access policy for those accesses in subsequent frames. In other words, based on observations made about particular memory accesses in a particular frame, the dynamic cache policy controller 304 controls the memory access policy for the same memory accesses in one or more subsequent frames. Memory accesses are considered "the same" from frame to frame if the memory accesses occur in approximately the same place in an order of memory accesses of a frame. More specifically, in general, time-adjacent frames render very similar graphical information and thus have a very similar pattern of memory accesses. The term "approximately" allows for the possibility that some memory accesses that occur in one frame may not occur in another frame, since the frames can be somewhat different, meaning that the order of memory accesses between frames will not be identical.

A memory access policy is a policy that controls how a cache 302 manages information for cache lines targeted by a memory access request. In an example, the memory access policy controls three aspects: the age at which a new cache line is brought into the cache (e.g., as the result of a miss), the manner in which ages of the cache lines are updated when a miss occurs (e.g., how cache lines other than the accessed cache line are aged), and the age that a cache line is updated to when a hit occurs for the cache line (e.g., what age is the cache line set to when it is accessed). These features are discussed in greater detail elsewhere herein.

It should be noted that the age referred to is an age in a least recently used cache replacement policy. More specifically, the cache 302 is a set-associative cache that includes a number of sets each having a plurality of ways. Any given cache line is mapped to at least one set and can be placed into any way in that set, but cannot be placed in any set that the cache line is not mapped to. A cache line is defined as a portion of the memory address space. In an example, each cache line has a cache line address which includes a certain number of the most significant bits of the address, such that the remaining least significant bits specify an offset in that cache line. Typically, though not necessarily, a cache line is the minimum unit of data read into or written back from the cache. When a cache line is to be brought into a set of the cache 302 and there are no free ways for the cache line, the cache 302 evicts one of the cache lines in the set. The replacement algorithm selects the oldest cache line as the cache line to evict based on the ages of the cache lines in that set. The cache 302 also places the new cache line into the cache 302 with a "starting age." In the event of a hit, the cache 302 updates the age of the cache line for which the hit occurred based on the memory access policy. Additional details are provided elsewhere herein.

Figure 4:
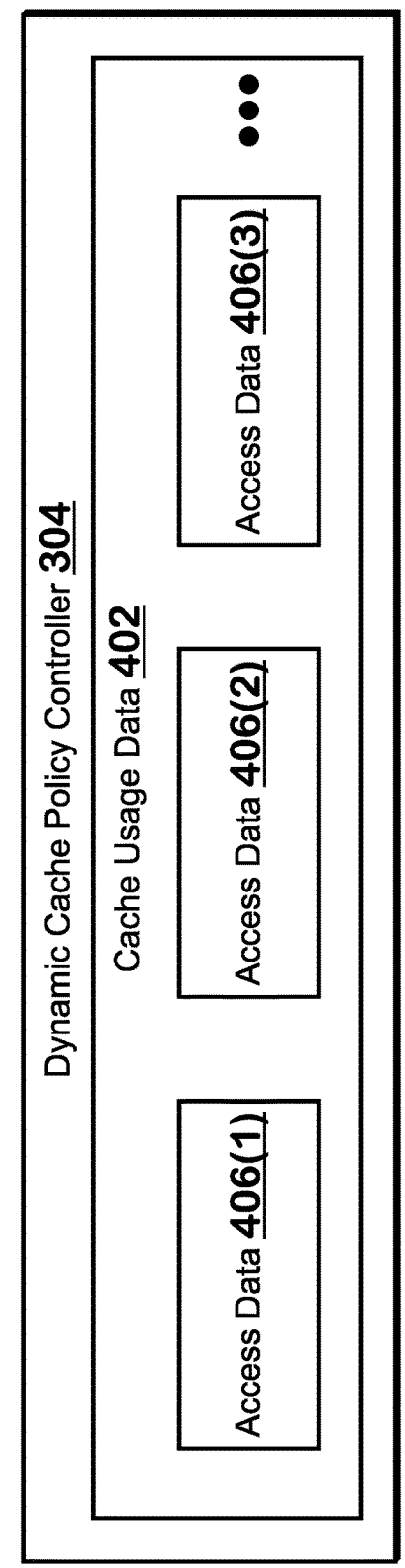
FIG. 4 illustrates additional details of the dynamic cache policy controller, according to an example.

FIG. 4 illustrates additional details of the dynamic cache policy controller 304, according to an example. The dynamic cache policy controller 304 stores and maintains cache usage data 402. The cache usage data 402 includes the memory access information for "sets" of memory accesses in a frame. Each access data item 406 includes information that characterizes a certain set of one or more memory accesses. In some examples, each set of memory accesses is one or more memory accesses that occur within a certain amount of "time" and within a certain memory address range (such as a page). In some examples, time is represented by real time, cycle count, instruction count, or any other measure of time. Thus, each data item 406 includes information about memory accesses that occur within a particular period of time within a frame and that occur to the same memory address range. Put differently, in different examples, accesses occurring within a threshold number of instructions, a threshold number of computer clock cycles, or a threshold amount of time are grouped together into the set that corresponds to an access data item 406.

In some examples, the dynamic policy controller 304 records the access data items 406 as the corresponding accesses occur. In some examples, the dynamic policy controller 304 calculates additional information for each access data item 406 in response to the frame ending or at some other point in time (e.g., when the "time" for an access data item 406 is over). In one example, the dynamic policy controller 304 determines the re-reference interval and the re-reference intensity for the accesses corresponding to the access data item 406. Then, the dynamic policy controller 304 determines a policy corresponding to the access data item 406 according to the re-reference interval and re-reference intensity for the accesses corresponding to the access data item 406. In some examples, the dynamic policy controller 304 determines the policy based on the re-reference interval and re-reference intensity from multiple frames. In some examples, the dynamic policy controller 304 records this policy into the access data item 406 to use for the subsequent frame. The access data item 406 thus indicates, for a particular page and a particular "time" in the frame, what policy to use.

This policy information allows the dynamic cache policy controller 304 to "condition" accesses made in frames subsequent to the frame(s) in which the access data items 406 are recorded. "Conditioning" memory accesses means setting parameters for the memory accesses, where the parameters correspond to the determined re-reference interval values and the determined re-reference intensity values. For example, in a first frame, the dynamic cache policy controller 304 records a first access data item 406 for a set of memory accesses that access the same page. The first access data item 406 indicates a certain policy for that set of memory accesses. In a subsequent frame, the dynamic cache policy controller 304 identifies the same accesses (that is, the accesses of the first access data item 406) and "conditions" those accesses according to the policy stored in the first access data item 406. More specifically, the dynamic cache policy controller 304 configures those accesses to use the policy that corresponds to the first access data item 406. Such a policy indicates that these accesses in the subsequent frame should be made according to a certain set of settings. In some examples, the policy indicates the following: how to age cache lines other than the accessed cache line and in the same set as the cache line, in the event of a miss; what age to insert a new cache line into the cache line; and what age to set a cache line to when a hit occurs.

Aging cache lines in the event of a miss is now described. When a miss occurs in the cache 302, the cache 302 identifies the cache line to bring into the cache. The cache 302 also determines which set the identified cache line is to be brought in to. If any cache line in that set has an age that is equal to or greater than a threshold (e.g., 3 if the age counter is two bits), then the cache 302 selects that cache line for eviction. If no cache lines have an age that is higher than a threshold, then the cache 302 ages the cache lines of the set. The setting of how cache lines are to aged in the event of a miss indicates which cache lines of a set are aged in the event that a miss occurs in that set and no cache line has an age that is equal to or greater than a threshold. In some examples, this setting indicates, by age, which cache lines will be aged in the event of a miss. In other words, the setting indicates the ages of cache lines that will be aged in the event of a miss. In an example of the setting, the setting indicates that cache lines of all ages lower than the above threshold (the "eviction threshold") are aged. In another example, the setting indicates that cache lines having ages above an age trigger threshold, which can be lower than the eviction threshold, are aged. In this situation, cache lines with ages lower than or equal to the low threshold are not aged in the event of a miss. In sum, in some examples, the re-reference interval and re-reference intensity of a set of memory accesses for one frame indicates how to age cache lines (specifically, the ages of cache lines that will be aged) in the event of a miss for the set of memory accesses in a subsequent frame.

The setting of what age to insert a new cache line into the cache is now described. When a cache line is brought into the cache as the result of a miss, the cache line is initially given a particular age. In some examples, this "starting" age is the lowest possible age, some intermediate age that is above the lowest possible age, or the maximum age. Again, this setting is dependent on the memory accesses reflected in an access data item 406. Thus, the access data item 406, corresponding to a memory page, indicates the starting age for a cache line in the event that a miss occurs and the cache line is copied into the cache.

What age to set a new cache line to when a hit occurs is now described. When a hit occurs to a cache line, the cache 302 updates the age of that cache line (e.g., to indicate that the cache line is "newer"). In some examples, this setting indicates that the cache line is to have a particular age (such as 0) when a hit occurs for that cache line. In other examples, the setting indicates that the cache line is to have a different age such as 1, 2, or 3 (for a two bit age counter) in the event of a hit. In other examples, this setting indicates that the age of a cache line is to be modified in a particular manner, such as by decrementing the age by a number like 1. In sum, the access data item 406, corresponding to a memory page, indicates how the age of a cache line is modified when a hit occurs for that cache line.

It should be understood that conditioning a particular cache access according to a policy means causing the cache access to occur with that policy. For the insertion age policy, this policy is applied for an access conditioned according to that policy if that access results in a miss. The cache line that is to be brought in is brought in according to the age specified by the policy. For the aging policy, this occurs for the access conditioned according to the policy in the event that that access results in a miss. In this situation, the aging policy causes the other cache lines for the same set to be aged as specified by the policy. For the policy that defines what age a cache line will be set to in the event of a hit, when an access occurs that is conditioned according to a policy, and that access results in a hit, the policy causes the age of the cache line targeted by the access to be set according to the policy.

Figure 5:
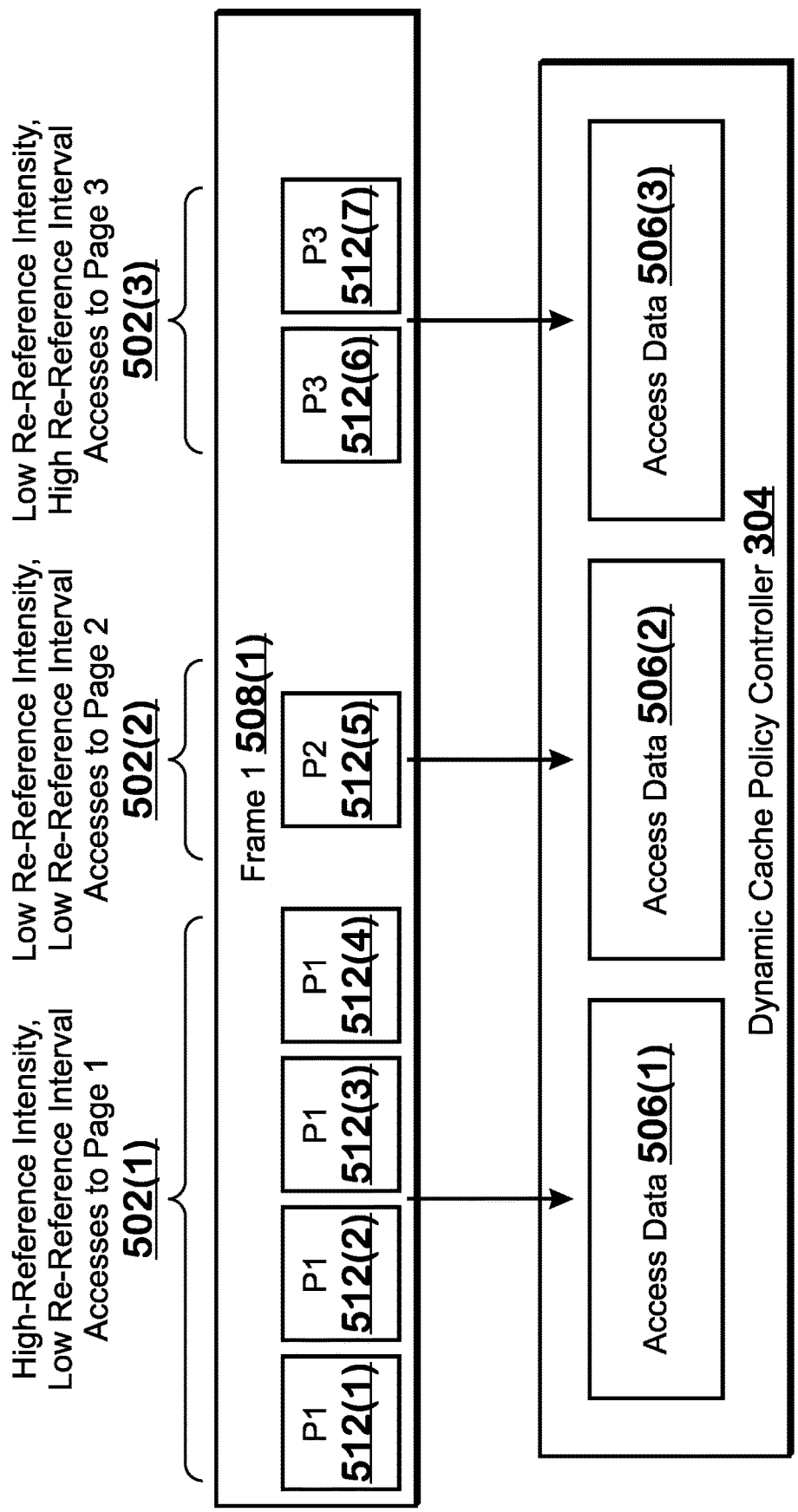
FIG. 5 illustrates operations for recording access patterns, according to an example.

FIG. 5 illustrates operations for recording access patterns, according to an example. FIG. 5 illustrates a single frame—frame 1 508(1) in which a number of accesses 512 are occurring. A first set of accesses—accesses 512(1) to 512(4) are to a first page P1 and occur within a certain time period. The dynamic cache policy controller 304 identifies the three sets of accesses 502 and generates access data items 506 corresponding to each of the sets of accesses 502. These data items indicate the access times and the addresses (including or represented as pages) targeted by the accesses. For the first set 502(1), the dynamic cache policy controller 304 notes that that set has a high-reference intensity and a low re-reference interval. There is a high re-reference intensity because there are a lot of accesses to the same page, and there is a low-reference interval because the accesses occur relatively close together in "time." The dynamic cache policy controller 304 thus records the access data item 506(1) that indicates a policy associated with this re-reference interval and re-reference intensity in the access data item 506(1).

For the second set of accesses 502(2), which includes access 512(5) and is made to page P2, there is a low re-reference intensity and low re-reference interval. Thus, the dynamic cache policy controller 304 records a policy associated with this combination into access data item 506(2). For the third set of accesses 502(3), which includes accesses having a low re-reference intensity and high re-reference interval, reflected in accesses 502(6)-502(7), and made to page P3, the dynamic cache policy controller 304 records access data item 506(3), which records a policy that reflects the re-reference intensity and re-reference interval of set 502(3).

Figure 6:
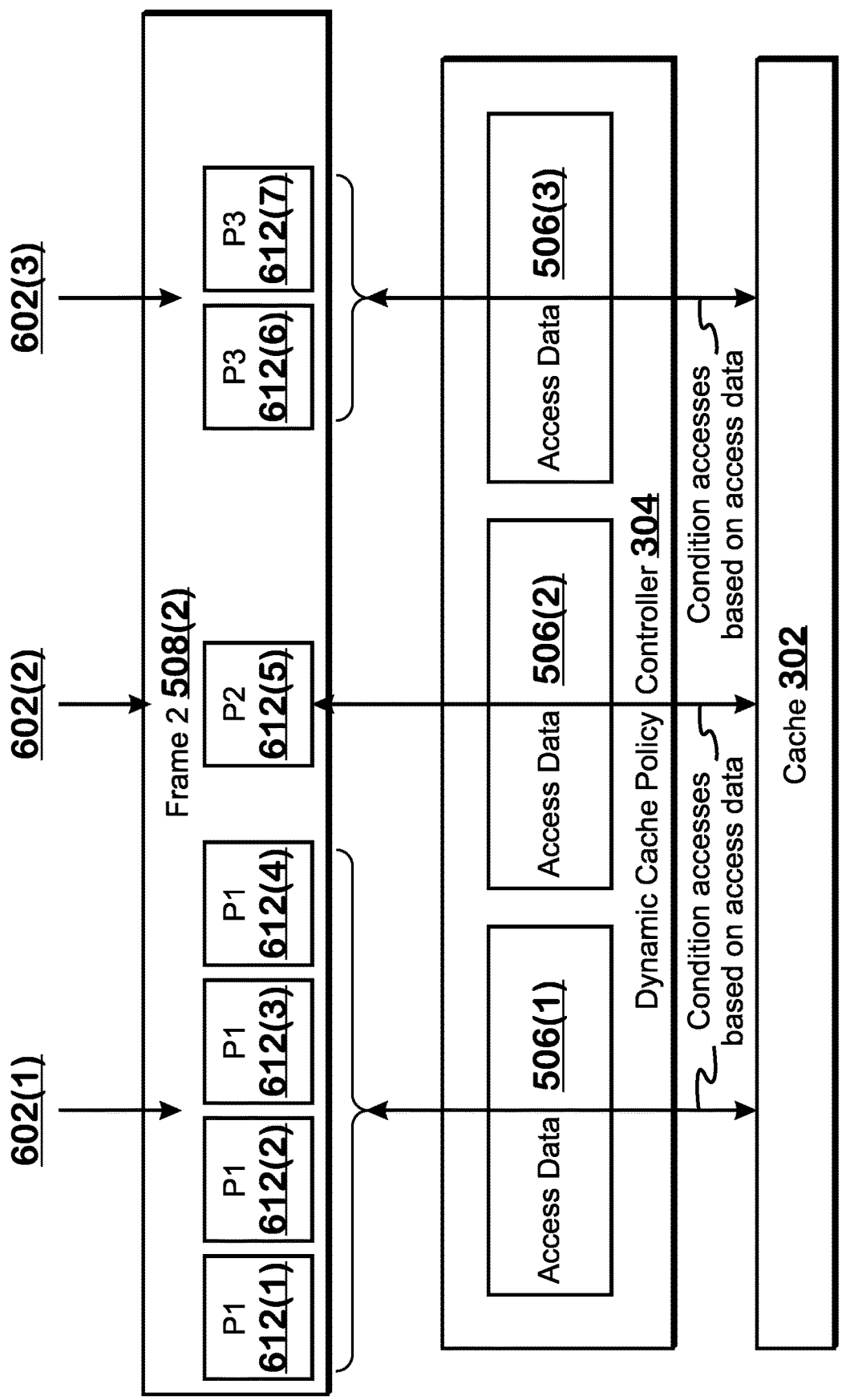
FIG. 6 is a block diagram illustrating utilization of the access data items to modify the accesses in a second frame, according to an example.

FIG. 6 is a block diagram illustrating utilization of the access data items to condition the accesses in a second frame 508(2), according to an example. Three sets 602 of data accesses 612 are illustrated. The dynamic cache policy controller 304 conditions these accesses according to the access data items 506 created in frame 1 508(1) of FIG. 5. For the data accesses 612 of the first set 602, the dynamic cache policy controller 304 identifies the first access data item 506(1). This access data item 506 indicates a certain manner in which to condition the accesses 612 of the set 602(1). As described elsewhere herein, the access data item 506 indicates a policy, which indicates one or more of how to age cache lines when a miss occurs, what age to set new cache lines to, and what age to set cache lines to in the event of a hit. Additionally, this policy is dependent on the data recorded in frame 1 508(1) about the same accesses from that frame. The dynamic cache policy controller 304 causes the policy applied to the accesses of a given set 602 to be applied based on the recorded access data item 506 for the same accesses in a previous frame. Similar activity is applied for set 602(2) and set 602(3).

The dynamic cache policy controller 304 determines which accesses in a particular frame are "the same as" accesses in a previous frame in the following manner. In each frame, memory accesses occur in a particular sequence. This sequence is mostly repeated from frame to frame. Thus, the dynamic cache policy controller 304 tracks the sequence of memory accesses to identify which accesses are "the same" from frame to frame. It is true that some accesses may differ from frame to frame, so the dynamic cache policy controller 304 accounts for such differences. For example, the dynamic cache policy controller 304 may notice omitted accesses, added accesses, or other modifications, and account for those. In some examples, memory accesses that occur to the same page and at the same "time" in different frames are considered to be "the same" memory accesses. In examples, the "time" is defined based on access order. For example, the first through one hundredth accesses are in a first "time," the one hundred first through two hundredth are in a second "time," and so on. Any other technically feasible means for determining the time is possible.

It should be understood that the manner in which accesses are "conditioned" is based on the access data items 506 recorded in a previous frame. Thus, for one particular access data item 506, which indicates a particular combination of re-reference interval and re-reference intensity, corresponding accesses are made with a first set of parameters including manner of aging cache lines, age to insert new cache lines, and age to update hit cache lines. For another particular access data item 506, which indicates a different combination of re-reference interval and re-reference intensity, corresponding accesses are made with a second set of parameters including manner of aging cache lines, age to insert new cache lines, and age to update hit cache lines. At least one of the parameters of the second set is different from at least one of the parameters of the first set.

Figure 7:
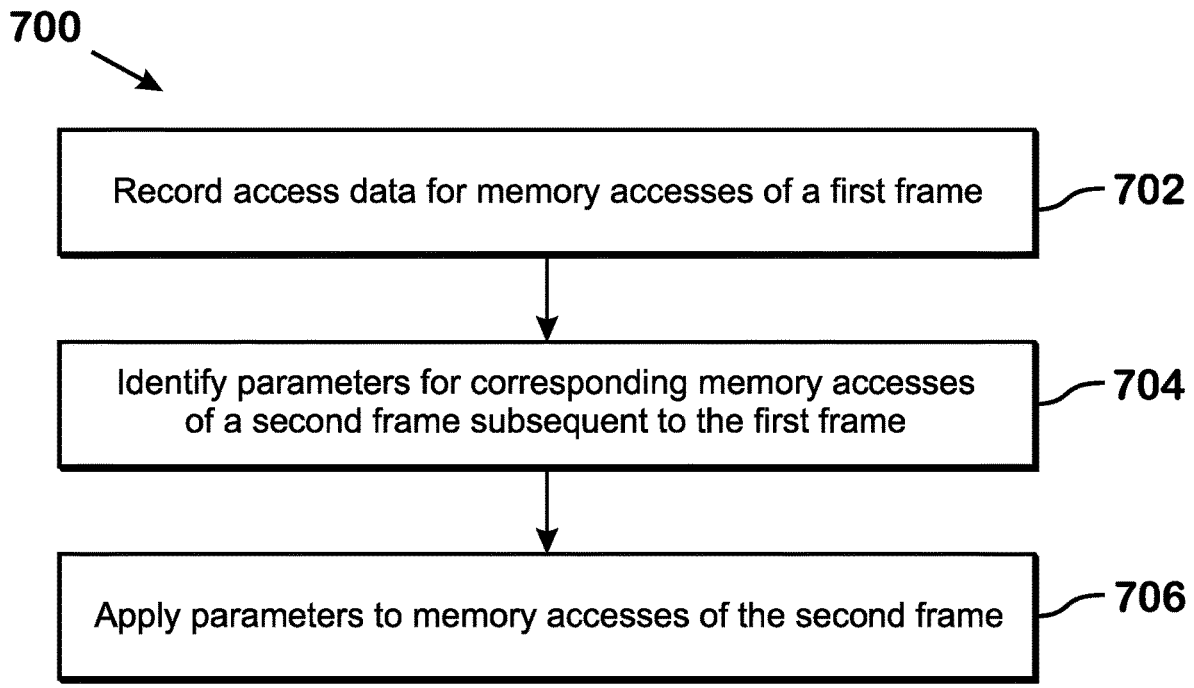
FIG. 7 is a flow diagram of a method for managing memory accesses, according to an example.

FIG. 7 is a flow diagram of a method 700 for managing memory accesses, according to an example. Although described with respect to the system of FIGS. 1-6, those of skill in the art will understand that any system, configured to perform the steps of the method 700 in any technically feasible order, falls within the scope of the present disclosure.

At step 702, the dynamic cache policy controller 304 records access data items 406 for memory accesses of a first frame. Each access data item 406 corresponds to a set of one or more memory accesses. In some examples, the memory accesses of each set share a memory page or share a different subset of the memory. Each access data item 406 includes information characterizing the memory accesses of the set corresponding to that access data item 406. In some examples, this information is associated with one or both of re-reference interval (e.g., "time" between references to the same address or page) or re-reference intensity (e.g., number of accesses again within a particular window of "time"—meaning number of instructions, clock time, clock cycles, or other measure of time). In some examples, the dynamic cache policy controller 304 records the access data items 406 for multiple sets of accesses within the frame.

At step 704, for a second frame subsequent to the first frame, the dynamic cache policy controller 304 identifies parameters for corresponding memory accesses to the accesses for which access data was recorded in the first frame. The parameters include information indicating how such memory accesses are to be conditioned when provided to the cache 302 to be satisfied. In some examples, the memory accesses for which parameters are identified are the same memory accesses for which the corresponding access data is stored in the first frame. In other words, in some examples, in step 704, the dynamic cache policy controller 304 identifies how to condition accesses of the second frame based on the access data recorded for those accesses in the first frame.

At step 706, the dynamic cache policy controller 304 applies the identified parameters to the memory accesses in the second frame. In some examples, the parameters indicate how to age cache lines in the event of a miss as described elsewhere herein. In some examples, the parameters indicate what age to insert new cache lines into the cache 302 in the event of a miss. In some examples, the parameters indicate what age to set a cache line to in the event of a hit. Applying these parameters to memory accesses is described elsewhere herein.

The elements in the figures are embodied as, where appropriate, software executing on a processor, a fixed-function processor, a programmable processor, or a combination thereof. The processor 102, last level cache 110, interconnect 112, memory 104, storage 108, various auxiliary devices 106, APD 116 and elements thereof, and the dynamic cache policy controller 304, include at least some hardware circuitry and, in some implementations, include software executing on a processor within that component or within another component.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for operating a cache, the method comprising:
    recording access data for a first set of memory accesses of a first frame;
    identifying parameters for a second set of memory accesses of a second frame subsequent to the first frame, based on the access data; and
    applying the parameters to the second set of memory accesses.

2. The method of claim 1, wherein the access data includes a memory accesses characterized by one or both of re-reference interval and re-reference intensity.

3. The method of claim 2, wherein re-reference interval indicates time between accesses and re-reference intensity indicates number of accesses to the same address in a window of time.

4. The method of claim 1, wherein the parameters include one or more of an indication of how to age cache lines in the event of a miss, an indication of what age to insert cache lines in the event of a miss; and an indication of how to modify an age of a cache line to in the event of a hit.

5. The method of claim 1, wherein the second set of memory accesses are considered to be the same as the first set of memory accesses, based on order of the first memory accesses within the first frame and on order of the second memory accesses within the second frame.

6. The method of claim 1, wherein applying the parameters to the second set of memory accesses includes causing the second set of memory accesses to occur as specified by the parameters.

7. The method of claim 1, wherein the first set of memory accesses and the second set of memory accesses comprise accesses to a cache.

8. The method of claim 1, wherein the first frame and the second frame are frames of graphics rendering.

9. The method of claim 1, wherein each memory access of the first set of memory accesses are to the same memory page.

10. A system, comprising:
a cache; and
a dynamic cache policy controller configured to:
record access data for a first set of memory accesses of a first frame;
identify parameters for a second set of memory accesses of a second frame subsequent to the first frame, based on the access data; and
apply the parameters to the second set of memory accesses.

11. The system of claim 10, wherein the access data includes a memory accesses characterized by one or both of re-reference interval and re-reference intensity.

12. The system of claim 10, wherein re-reference interval indicates time between accesses and re-reference intensity indicates number of accesses to the same address in a window of time.

13. The system of claim 10, wherein the parameters include one or more of an indication of how to age cache lines in the event of a miss, an indication of what age to insert cache lines in the event of a miss; and an indication of how to modify an age of a cache line to in the event of a hit.

14. The system of claim 10, wherein the second set of memory accesses are considered to be the same as the first set of memory accesses, based on order of the first memory accesses within the first frame and on order of the second memory accesses within the second frame.

15. The system of claim 10, wherein applying the parameters to the second set of memory accesses includes causing the second set of memory accesses to occur as specified by the parameters.

16. The system of claim 10, wherein the first set of memory accesses and the second set of memory accesses comprise accesses to a cache.

17. The system of claim 10, wherein the first frame and the second frame are frames of graphics rendering.

18. The system of claim 10, wherein each memory access of the first set of memory accesses are to the same memory page.

19. The system of claim 10, further comprising:
a graphics processing pipeline configured to render the first frame and the second frame.

20. A non-transitory computer-readable medium storing instructions that, when executed by a processor, cause the processor to perform operations comprising:
recording access data for a first set of memory accesses of a first frame;
identifying parameters for a second set of memory accesses of a second frame subsequent to the first frame, based on the access data; and
applying the parameters to the second set of memory accesses.

* * * * *